United States Patent [19]

Thompson et al.

[11] Patent Number: 4,701,844
[45] Date of Patent: Oct. 20, 1987

[54] DUAL CACHE FOR INDEPENDENT PREFETCH AND EXECUTION UNITS

[75] Inventors: Richard F. Thompson, Santa Clara; Daniel J. Disney, Felton; Swee-meng Quek, San Jose; Eric C. Westerfeld, Milpitis, all of Calif.

[73] Assignee: Motorola Computer Systems, Inc., Cupertino, Calif.

[21] Appl. No.: 918,667

[22] Filed: Oct. 16, 1986

Related U.S. Application Data

[63] Continuation of Ser. No. 595,176, Mar. 30, 1984, abandoned.

[51] Int. Cl.[4] .............................................. G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,573,851 | 4/1971 | Watson et al. | 364/200 |
| 3,916,385 | 10/1975 | Parman et al. | 364/200 |
| 3,949,379 | 4/1976 | Ball | 364/200 |
| 3,979,726 | 9/1976 | Lange et al. | 364/200 |
| 4,313,158 | 1/1982 | Porter et al. | 364/200 |
| 4,399,506 | 8/1983 | Evans et al. | 364/200 |
| 4,426,682 | 1/1984 | Riffe et al. | 364/200 |
| 4,439,839 | 5/1984 | Kreib et al. | 364/900 |
| 4,442,488 | 4/1984 | Hall | 364/200 |
| 4,521,851 | 6/1985 | Trubisky et al. | 364/200 |
| 4,536,840 | 8/1985 | Borta | 364/300 |
| 4,551,799 | 11/1985 | Ryan et al. | 364/200 |

Primary Examiner—Gary V. Harkcom
Assistant Examiner—C. H. Lynt
Attorney, Agent, or Firm—Walter W. Nielsen

[57] ABSTRACT

A pipelined digital computer processor system (10, FIG. 1) is provided comprising an instruction prefetch unit (IPU,2) for prefetching instructions and an arithmetic logic processing unit (ALPU, 4) for executing instructions. The IPU (2) has associated with it a high speed instruction cache (6), and the ALPU (4) has associated with it a high speed operand cache (8). Each cache comprises a data store (84, 94, FIG. 3) for storing frequently accessed data, and a tag store (82, 92, FIG. 3) for indicating which main memory locations are contained in the respective cache.

The IPU and ALPU processing units (2, 4) may access their associated caches independently under most conditions. When the ALPU performs a write operation to main memory, it also updates the corresponding data in the operand cache and, if contained therein, in the instruction cache permitting the use of self-modifying code. The IPU does not write to either cache. Provision is made for clearing the caches on certain conditions when their contents become invalid.

1 Claim, 5 Drawing Figures

DUAL CACHE FOR INDEPENDENT PREFETCH AND EXECUTION UNITS

This application is a continuation of application Ser. No. 595,176, filed 3/30/84, now abandoned.

TECHNICAL FIELD

This invention relates generally to digital computing apparatus, and, in particular, to a pipelined processor system comprising a first processing unit for prefetching instructions and a second processing unit for executing instructions, each processing unit having associated therewith a high speed cache memory unit.

BACKGROUND OF THE INVENTION

It is known in the digital data processing art to provide multiple processing units and to overlap the operation thereof, so that instruction execution is conducted by the processing units working in parallel in a "pipelined" fashion. For example, one processing unit may be used to fetch instructions to be processed, and a second processing unit may be used to execute the instructions. The overall processing time is shortened, since the first processing unit is already fetching the next instruction while the second processing unit is executing the previous instruction.

It is also known in the digital data processing art to shorten the processor cycle time, defined as the time required by the processor to execute a given instruction, by providing a relatively low capacity, fast cycle time memory (known as a "cache memory") between the processor and the relatively high capacity, slow cycle time main memory. During the "fetch" portion of the instruction execution cycle, the processor first checks the cache memory to see whether the desired information resides in it. If it does, the processor is able to access the information faster than if it had to access the main memory. If the information is not contained within the cache memory, then a block of information stored in the main memory, including the information being fetched by the processor, is stored into the cache memory, since there is a relatively high probability that subsequent memory accesses will be to information stored in such block. The condition in which the information requested by the processor is found within the cache is called a cache "hit", and the opposite condition is called a cache "miss".

The present invention provides a high performance digital processing system achieving a relatively short processor cycle time, by providing a pair of pipelined processors, one for fetching instructions, the other for executing the instructions, and providing a high speed cache memory for use by each processor. Under virtually all conditions the cache memory associated with each processor is accessible by such processor at any time and independently of the operation of the other processor and its associated cache memory.

BRIEF SUMMARY OF INVENTION

Accordingly, it is an object of the present invention to provide an improved digital processing system.

It is also an object of the present invention to provide a digital processing system achieving high throughput by utilizing a first processing unit for prefetching instructions and a second processing unit for executing instructions, each processing unit having associated therewith a high speed cache memory unit.

It is a further object of the present invention to provide a pipelined digital processing system achieving high throughput by providing a high speed cache memory unit for each of two independent processing units, in which such cache memory units are accessible at any time by its associated processing unit, independently of the operation of the other processing unit and the other cache memory unit.

These and other objects are achieved in accordance with a preferred embodiment of the invention by providing a digital processing system for use with a relatively large capacity, low cycle time main memory unit storing at addressable locations thereof a relatively large number of blocks of information, including instructions and operands, useable in such system, the digital processing system comprising an instruction prefetch unit for fetching the instructions, an arithmetic logic processing unit for executing the instructions, a relatively low capacity, fast cycle time instruction cache memory unit associated with the instruction prefetch unit for storing at addressable locations thereof a limited number of blocks of the information, the instruction cache memory unit including means responsive to the instruction prefetch unit for determining whether information sought by it is contained therein, and a relatively low capacity, fast cycle time operand cache memory unit associated with the arithmetic logic unit for storing at addressable locations thereof a limited number of blocks of the information, the operand cache memory unit including means responsive to the arithmetic logic processing unit for determining whether information sought by it is contained therein, whereby the cycle time of the instruction prefetch unit is reduced by the extent to which information sought by it is already present in the instruction cache memory unit, and whereby the cycle time of the arithmetic logic processing unit is reduced by the extent to which information sought by it is already present in the operand cache memory unit.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
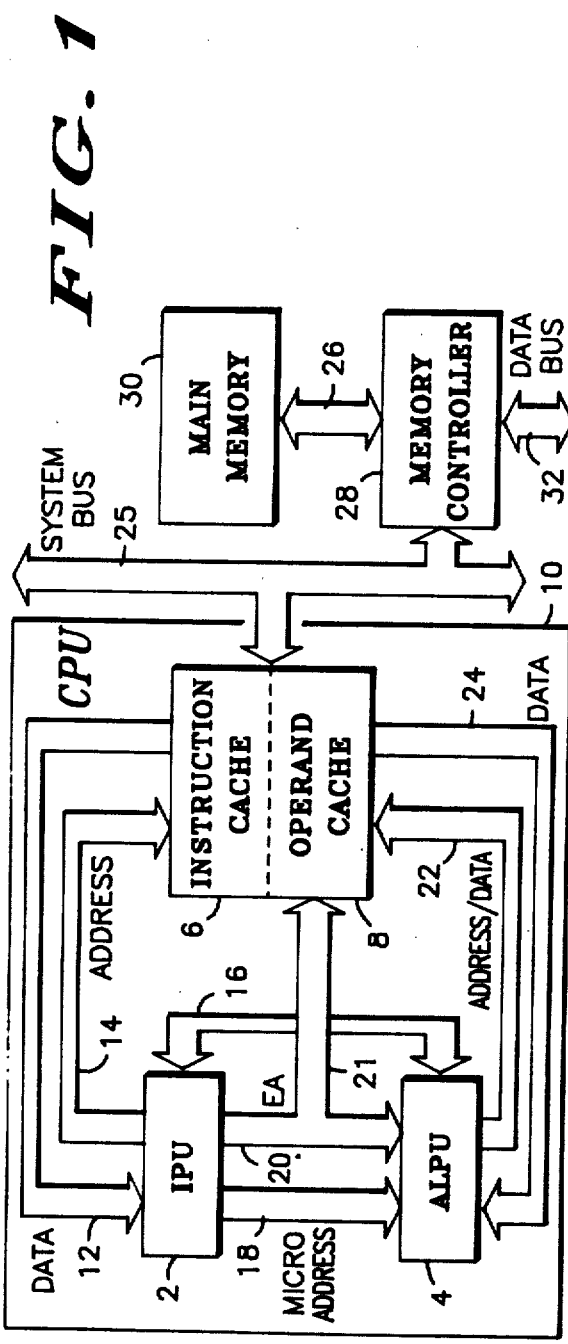
FIG. 1 shows a block diagram illustrating a preferred embodiment of a digital processing system incorporating the pipelined processors and dual cache memories of the present invention.

Referring now to FIG. 1, a block diagram illustrating a preferred embodiment of a digital processing system incorporating the pipelined processors and dual cache memories of the present invention is shown. The central processing unit (CPU) 10 comprises a pair of parallel processing units, namely the Instruction Prefetch Unit (IPU) 2 and the Arithmetic Logic Processing Unit (ALPU) 4. Each processing unit has its own high speed cache memory unit. Specifically, the IPU 2 has associated with it the Instruction Cache 6, and the ALPU 4 has associated with it the Operand Cache 8.

FIG. 1 shows the overall architecture of the digital processing system of the present invention, the chief features of which will now be described. The IPU 2 receives data information from the instruction cache 6 via data bus 12, and the IPU 2 sends address information to the instruction cache 6 via address bus 14. The IPU 2 sends microaddress information to the ALPU 4 via microaddress bus 18, and the IPU 2 sends effective address information to the ALPU 4 via effective address (EA) bus 20 and also directly to the operand cache 8 via bus 21. The IPU 2 can also communicate with the ALPU 4 via 24-bit data bus 16.

The ALPU 4 sends address and data information to the operand cache 8 via address/data bus 22, and the ALPU 4 receives data information from the operand cache 8 via data bus 24.

The instruction cache 6 and operand cache 8 communicate with main memory 30 via a system bus 25 through memory controller 28 and bus 26. Direct Memory Accesses (DMA's) may also be made to the main memory by preiphreal units (not shown) via the memory controller 28 and bus 26.

The IPU 2 and ALPU 4 together perform parallel processing on instructions, thereby decreasing the time required to execute instructions. The separate instruction cache 6 and operand cache 8 decrease the time required for their corresponding processing unit to access memory. The combination of parallel processing units with a separate cache memory unit for each achieves a significant improvement in overall processor performance.

The function of the IPU 2 is to fetch instructions, whereas that of the ALPU 4 is to execute instructions. As the IPU 2 fetches the instructions, it computes the effective address of the operand, if necessary, and passes them to the ALPU 4 for execution. Most of the time the ALPU 4 is working on executing the preceding instruction, while the IPU 2 is working on fetching the current instruction. The IPU 2 has a two instruction "pipe", so that it is possible for the IPU 2 to be two instructions ahead of the ALPU 4.

The IPU 2 also monitors all interrupt, trap, and console (not shown) signals, and it alters the program flow accordingly. The IPU 2 has the ability to detect most of the conditions that would invalidate prefetching of instructions. In such cases, it either doesn't prefetch, or if it did it empties its pipe.

The ALPU 4 performs the execution phase of instruction execution. When the ALPU 4 is through with executing an instruction, it asks for another one from the IPU 2. If the IPU 2 doesn't have one ready, then the ALPU 4 idles until one is ready.

Because the IPU 2 and the ALPU 4 process in parallel, they must maintain duplicate copies of the index registers and other information. Whenever the ALPU 4 updates one of these items, it must send the new data to the IPU 2 so that it could update its own copy.

Figure 2A:
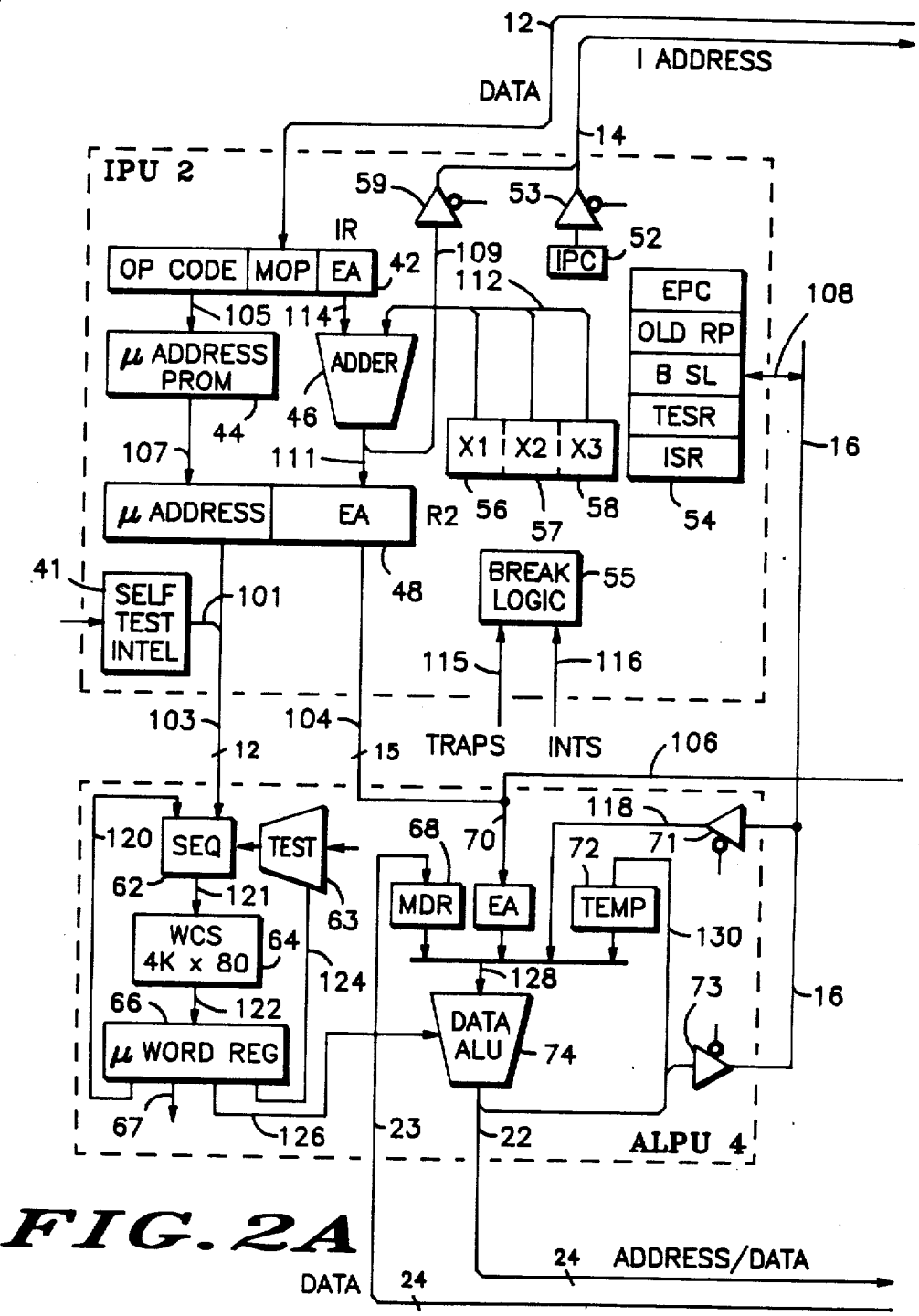
FIGS. 2A and 2B show a more detailed block diagram of the digital processing system of the present invention.
Figure 2B:
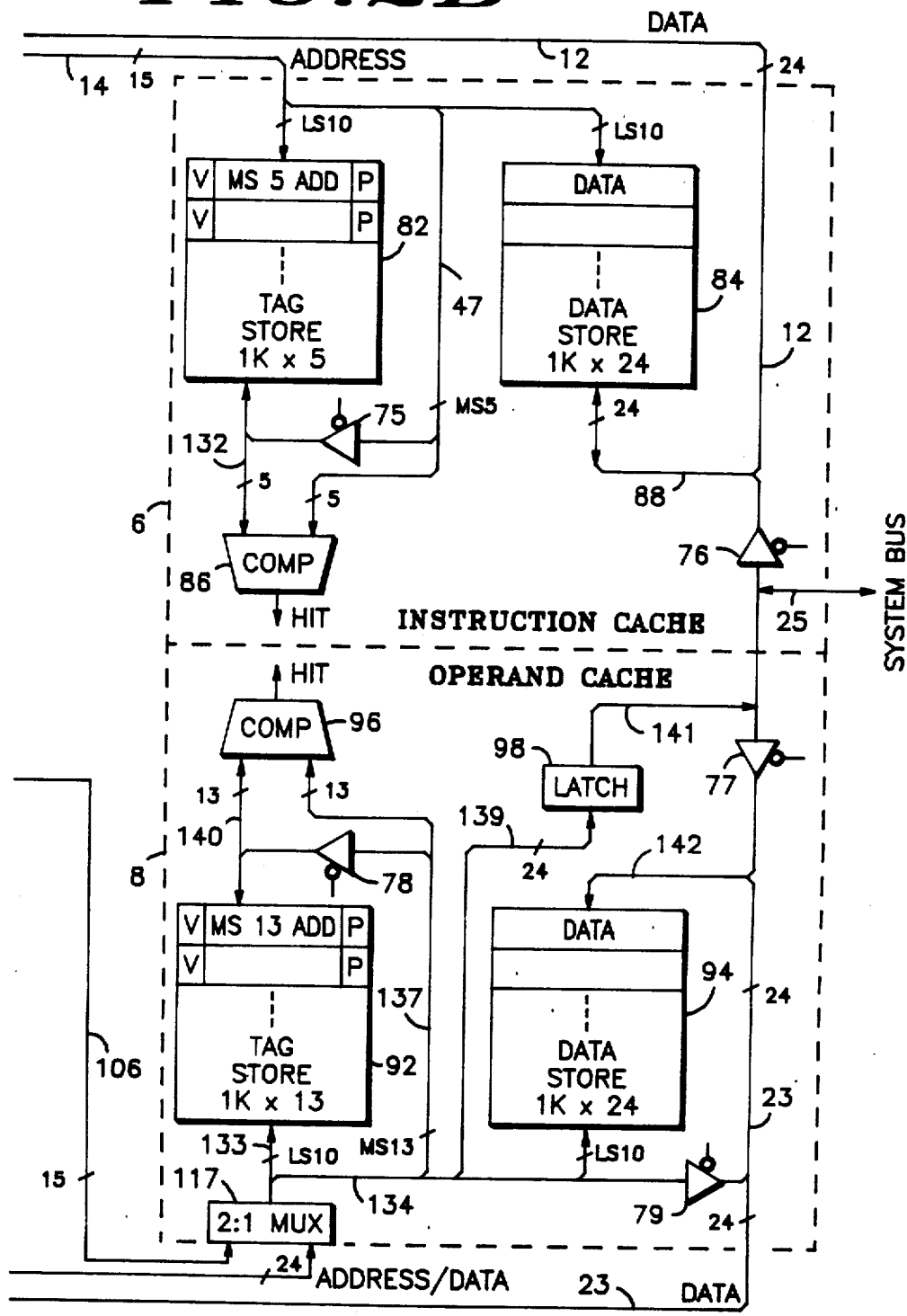

FIGS. 2A and 2B show a more detailed block diagram of the digital processing system of the present invention. The IPU 2 is shown in detail in the upper portion of FIG. 2A, and the ALPU 4 is shown in the lower portion of FIG. 2A. The instruction cache 6 is shown in the upper portion of FIG. 2B, and the operand cache 8 is shown in the lower portion of FIG. 2B.

The detailed features of the IPU 2, ALPU 4, instruction cache 6, and operand cache 8 will now be described with reference to FIG. 2A and FIG. 2B. First regarding FIG. 2A, the IPU 2 is shown as comprising an instruction register (IR) 42, which receives an instruction to be executed over data bus 12 from main memory 30 (FIG. 1) via system bus 25 (FIG. 2B). Instruction register 42 includes an operation code (op code) portion, a micro-operation code (MOP) portion, and an effective address (EA) portion. The op code portion of an instruction in instruction register 42 is conducted over internal bus 105 to a microaddress programmable read only memory (PROM) 44, which reads out the appropriate microaddress over bus 107 corresponding to the particular op code input over bus 105. The microaddress is stored temporarily in the microaddress portion of R2 register 48.

The EA portion of an instruction in instruction register 42 is conducted over bus 114 to adder 46. Adder 46 also receives as an input over bus 112 any one or more of the index words X1-X3 stored in the 24-bit index registers 56-58. One or more of index registers 56-58 may have been loaded, for example, by a previous instruction by means of an appropriate connection (not shown) to ALPU 4. Adder 46 generates a 15-bit output over bus 111 to the EA portion of R2 register 48, as well as a 15-bit output over bus 109, through tri-state buffer 59, to instruction address bus 14 connected to the instruction cache 6.

The IPU 2 also contains an instruction program counter (IPC) 52 which holds the address of the current instruction, and which may be loaded by an appropriate connection (not shown) to the ALPU 4. The output of the IPC 52 is conducted through tri-state buffer 53 to address bus 14, which is coupled to the instruction cache 6.

Break logic 55, responsive to "traps" and "interrupts" over lines 115 and 116 respectively, is provided within the IPU 2 for a purpose to be described in greater detail below.

Also contained within the IPU 2 are assorted registers and circuits which, while illustrated, are not particularly germane to the present invention. Among these are the self-test intelligence circuit 41 and an assortment of registers indicated generally by reference numeral 54, and including the effective program counter (EPC), last program address register (OLD RP), break status code register (BSL), test register (TESR), and an instruction status register (ISR), all of which are coupled via bus 108 to internal bus 16.

The ALPU 4 is shown comprising a sequencer 62, which in the preferred embodiment of the invention is implemented with an Advanced Micro Devices (AMD) 2911 general purpose microprogrammable control device. The sequencer 62 performs a variety of functions, including counting, incrementing, branching, stacking addresses, etc. The sequencer 62 uses the microaddress word coming from R2 register 48 to address the writeable control store (WCS) 64 in order to locate the sequence of microinstructions corresponding to the op code previously input into the instruction register 42. The output of the WCS 64 is stored temporarily in the 80-bit microword register 66 before being conducted over bus 120 where it is available at the input of sequencer 62. The contents of the microword register 66 are also conducted over bus 126 to the data arithmetic logic unit (Data ALU) 74, over bus 124 to a test circuit 63, and over internal bus 67 from which they may be made available to other portions of the CPU. The test circuit 63 tests status bits (e.g. overflow condition) from the microprogram. It also tells the microprogram whether to branch or increment.

The data ALU 74 is implemented with an AMD 2901 device. There are 14 working registers in the data ALU 74, five of which are available to the programmer. The data ALU 74 is fed by a memory data register (MDR) register 68, an effective address (EA) register 70, a temporary register 72, and bus 118 which is coupled to internal bus 16 through tri-state buffer 71. The input to the MDR register 68 is coupled to data bus 23. The input to EA register 70 is coupled to the output of the EA portion of the R2 register 48 of IPU 2 via 15-bit bus 104. The EA contents of the R2 register 48 are also conducted over bus 106 directly to a 2:1 multiplexer 117 in the operand cache 8. The input of the temporary register 72 is coupled to the output of the data ALU 74 via bus 130. The output of the data ALU 74 is coupled to the address/data bus 22, which is connected to the operand cache 8, as well as to internal bus 16 through tri-state inverter 73.

Now regarding FIG. 2B, the instruction cache 6 is shown comprising a tag store 82, organized as a 1K word by 5-bit memory. Each 5-bit word in the tag store 82 also has appended to it a "valid" bit, which indicates whether the particular word is valid or not, and 3 parity bits, so that each word in the tag store is actually 9 bits wide. The tag store 82 is addressable by the least significant (LS) 10 bits of the 15-bit address on instruction address bus 14. The tag store 82 is coupled by bidirectional 5-bit bus 132 to comparator 86. Comparator 86 is also coupled to bus 47, over which are conducted the 5 most significant (MS) bits of the 15-bit address on instruction address bus 14. Bus 47 is also coupled through tri-state inverter 75 to tag store 82.

The least significant (LS) 10 bits of the 15-bit address on instruction address bus 14 are also coupled to data store 84, which is organized as a 1K word by 24-bit memory. Data store 84 is the high speed memory unit associated with the IPU 2 and contains up to 1K of 24-bit words which are currently in use by the IPU 2 or which have a high probability of being used by the IPU 2. The output of the data store 84 is coupled via bus 88 to data bus 12, which in turn is coupled to the IPU 2 instruction register 42. The data store 84 is also coupled bidirectionally to the system bus 25 through tri-state inverter 76 via bus 88.

The operand cache 8 is shown comprising a tag store 92, organized as a 1K word by 13-bit memory. Each 13-bit word in the tag store 92 also has appended to it a "valid" bit, which indicates whether the particular word is valid or not, and 3 parity bits, so that each word in the tag store is actually 17 bits wide. The tag store 92 is addressable by the least significant (LS) 10 bits of either a 15-bit address from ALPU 4 on address/data bus 22 or a 15-bit effective address from IPU 2 on bus 106. These addresses are multiplexed onto busses 133 and 134 of the operand cache 8 by 2:1 multiplexer 117. The tag store 92 is coupled by bidirectional 13-bit bus 140 to comparator 96. Comparator 96 is also coupled to bus 137, over which are conducted the 13 most significant (MS) bits of the 24-bit address on address/data bus 22. Bus 137 is also coupled through tri-state inverter 78 to an input of tag store 92. The 13 most significant (MS) bit portion of the address/data bus 22 is coupled via bus 137 both to comparator 96 and through tri-state inverter 78 for storing such 13 MS address bits as data in tag store 92. In addition, the entire 24-bit width of address-/data bus 22 is coupled via tri-state inverter 79 to bus 23 and via busses 134 and 139 to tri-state latch 98, whose output is coupled via bus 141 to the system bus 25.

The data store 94 is the high speed memory unit associated with the ALPU 4 and contains up to 1K of 24-bit words which are currently in use by the ALPU 4 or which have a high probability of being used by the ALPU 4. The data store 94 is coupled to the 10 least significant (LS) bit portion of address/data bus 22. The output of the data store 94 is coupled via bus 142 to data bus 23, which in turn is coupled to the ALPU 4 MDR register 68. The data store 94 is also coupled bidirectionally to the system bus 25 through tri-state inverter 77 via bus 142.

OPERATION OF PREFERRED EMBODIMENT

The instruction cache 6 and the operand cache 8 are two independent caches each of 1024 words, which act as buffers between the IPU 2 and ALPU 4 and main memory 30. The access time of each cache is about four times faster than that of main memory 30. Associated with each word in the respective cache are tags and a "valid" bit. The "valid" bit indicates that there is valid data in that word. Whenever a memory read is issued by the CPU, the low order 10 bits of the address are used to access the appropriate cache tag store.

For example, for a memory read issued by the IPU 2, the 10 low order bits of the address are used to access tag store 82 and to read out the corresponding most significant 5 address bits. The MS 5 bits are compared by comparator 86 with the MS 5 bits of the memory read address. If they match, and if there are no parity errors, and if the "valid" bit is true, there is a cache "hit", meaning that the data is taken from data store 84 rather than from main memory 30. If there is no cache hit, then the main memory 30 is accessed. In this event, when the data is returned from main memory 30, it is both written into data store 84, with new tag bits being written into tag store 82, and returned to the requester. The source of the data is transparent to the requester.

The instruction cache 6 is read only by the IPU 2. The IPU 2 cannot write to it.

The operand cache 8 can only be read and written to by the ALPU 4. Whenever the ALPU 4 issues a memory write operation, the data is written "through" the operand cache 8. This means that it is written both to the main memory 30 and to the corresponding cache location with the tag bits updated. This is done so that the cache and main memory agree.

When the ALPU 4 writes to memory, the cache also checks to see if that word is currently in the instruction cache 6. If so, then the ALPU 4 write data is written into the instruction cache 6. This is in addition to the "write through" of the operand cache 8 mentioned above. This function permits the use of self-modifying code.

CACHE AND MAIN MEMORY ACCESS OPERATIONS

Several examples of read and write memory operations regarding the instruction cache 6 and the operand cache 8 will now be discussed. First, with regard to write operations, the operand cache 8 is written by the ALPU 4 (1) every time the ALPU 4 writes to the main memory 30, and (2) whenever memory data is returned to the ALPU 4 from the main memory 30 via the memory controller 28.

The instruction cache 6 is written by the ALPU 4 (1) whenever the ALPU 4 writes to the main memory 30, but only if the same main memory location is already present in the instruction cache 6, and (2) whenever memory data is returned to the IPU 2 from the main memory 30 via the memory controller 28.

With regard to read operations, if the requested information is available in the appropriate cache, then the information will be made available to the requesting unit at the end of the same memory cycle. I.e., for all cache "hits" the access time is one memory cycle.

If there is not a cache "hit", then the access time depends upon several factors, including contention for the system bus 25, contention for the memory controller 28, and main memory 30 access time. Regarding contention for the system bus 25, the ALPU 4 is normally given precedence over all other requesting units.

CACHE FLUSH/RESET OPERATIONS

On the occurrence of certain conditions, the information stored in the instructions cache 6 or in the operand cache 8 can no longer be considered valid. For example, if a direct memory access (DMA) write operation is performed over DMA bus 32 into the memory controller 28, it can be assumed that updated information will have been stored in the main memory 30, thus invalidating the corresponding information stored in either of the cache units. Invalidation of the cache contents also occurs, when, for example, a remapping of the main memory contents is carried out by the memory controller 28.

When the cache information becomes invalid, a "flush" or "reset" operation is performed. A "flush" operation means that the "valid" bits associated with the information words in the particular cache are all cleared (e.g. set to 0's). A "reset" operation means that both caches are "flushed". After a flush or reset operation, the individual locations in the cache(s) remain invalid until rewritten.

PROGRAMMING CONSIDERATIONS

While the cache units are transparent to application software, proper programming considerations can improve their overall efficiency.

Since the data store 84 portion of the instruction cache 6 is 1024 words long, care should be taken to avoid program loops which are more than 1024 words long, since "thrashing" will occur. I.e., instructions will be frequently swapped into the instruction cache 6, overlaid, and swapped out again, resulting in slower average memory access time.

Since the instruction cache 6 uses a direct map algorithm, and since it is 1024 words long, memory locations that are 1024 words apart will be mapped into the same location in the instruction cache 6. For example, main memory locations 0, 1024, 2048, etc. will be mapped into the same cache location. Thus, if there are routines that frequently call each other, they should not be located such that they are some multiple of 1024 locations apart, as "thrashing" would then occur. To optimize cache performance, excessive "thrashing" should be avoided, as by avoiding codes which frequently call each other and which are placed so that they get mapped to the same cache location.

Similar considerations apply to the operand cache 8. Long moves and scans through large buffers or tables will displace much of the contents of the operand cache 8.

EXAMPLE OF INSTRUCTION EXECUTION

Figure 3A:
FIG. 3A shows a timing diagram illustrating the execution of a sequence of instructions by a prior art digital processing system.

With reference now to FIG. 3A, a timing diagram illustrating the execution of a sequence of instructions by a prior art digital processing system is shown. The particular sequence of instructions is given only as an example, and many other instruction sequences could have been selected.

The instruction sequence shown in FIG. 3A is the following:

I0 = Load Register A (abbreviated LDA) with contents of a given memory location.

I1 = Add the contents of a given memory location to the contents of Register A (ADA). This instruction is indirect addressed.

I2 = Branch on Zero (BZO) to instruction I5.

I3 = Increment the given address location, skipping if it's 0 (INR).

I4 = Unconditional Branch (BRA) back to instruction I0.

I5 = a subsequent instruction.

The instruction sequence shown in FIG. 3A is executed by a prior art non-pipelined processor. The execution of each instruction comprises several sub-operations. For example, instruction I0 (LDA) comprises first an instruction fetch (IF), whereby the processor fetches from main memory the instruction word to be executed in response to the contents of a program counter (not shown). Next, the processor performs a delay (DEL) operation, since the processor cannot make two successive memory operations. Next, the processor performs a data fetch (DF) operation, whereby a data word is fetched from the main memory. Finally, the processor performs an execute (E) operation, whereby the data word is loaded into Register A (not shown), Register A being, for example, one of the processor's working registers accessible to the programmer.

For the ADA instruction I1, the processor fetches the instruction (IF), performs a delay operation (DEL), carries out an indirect addressing operation (IND), fetches the data word (DF), and executes the operation (E) by adding the fetched data word to the contents of Register A.

For the BZ0 instruction I2, the processor fetches the instruction (IF), performs a delay operation (DEL), tests whether the contents of the designated register are 0 (KILL), and executes the operation (E) by branching to the designated new program address if the designated register contents were 0.

For the INR instruction I3, the processor fetches the instruction (IF), performs a delay operation (DEL), fetches the data word (DF), performs a register load operation (E), performs a register add operation operation (E), performs a store operation (STM), and finally performs a test operation (E).

For the BRA instruction I4, the processor fetches the instruction (IF) and executes (E) it by branching unconditionally back to the I0 instruction.

Figure 3B:
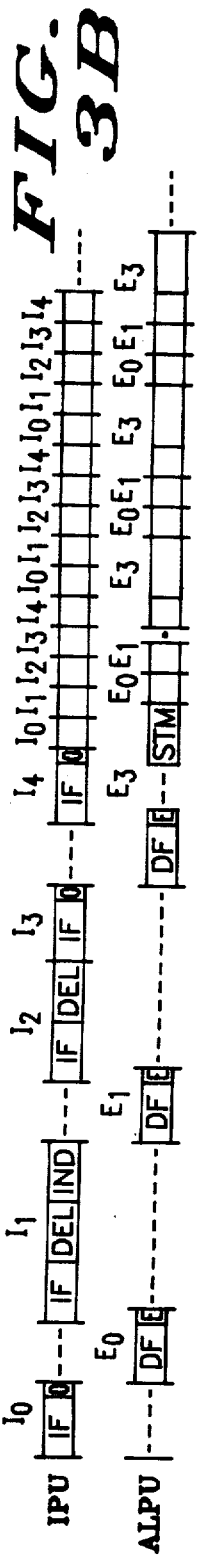
FIG. 3B shows a timing diagram illustrating the execution of the same sequence of instructions by the digital processing system of the present invention.

FIG. 3B shows a timing diagram illustrating the execution of the same sequence of instructions by the digital processing system of the present invention. The IPU performs the "fetch" portion of the instruction execution cycle, and the ALPU performs the "execution" portion.

The IPU begins the execution of the LDA instruction I0 by performing the instruction fetch (IF) operation.

At this time, if the requested instruction is not residing in the instruction cache 80, the instruction and associated block of instructions is read from the main memory 30 into the instruction cache 80. The next operation performed by the IPU is the next instruction fetch.

When the IPU has concluded its portion of the I0 instruction execution, the ALPU begins a data fetch (DF) operation. At this time, if the requested data word is not residing in the operand cache 90, the data word and associated block of instructions is read from the main memory 30 into the operand cache 90. Next the ALPU concludes its portion of the I0 instruction execution with an execute (E) operation.

When the IPU's data fetch (DF) portion of the I0 instruction execution has concluded, the IPU initiates its instruction fetch (IF) portion of the I1 instruction execution. In executing the I1 instruction, the IPU performs the IF portion, a delay portion (DEL), and then the indirect address portion executed by the prior art processor. When the IPU has concluded its portion of the I1 instruction execution, the ALPU begins a data fetch (DF) operation. The ALPU concludes its portion of the I1 instruction execution with an execute (E) operation.

When the IPU's data fetch (DF) portion of the I1 instruction execution has concluded, the IPU initiates its instruction fetch (IF) portion of the I2 instruction execution. The execution of the I2 instruction involves only the IPU, but it depends on E1 (i.e. as to whether or not it will branch).

At the IPU's conclusion of the execution of the I2 instruction, the IPU begins execution of the I3 instruction by performing an instruction fetch (IF) operation. When the IPU finishes the IF operation, the ALPU initiates a data fetch (DF) operation, followed by an execute (E) operation. When the ALPU finishes its data fetch operation on the I3 instruction, the IPU begins an instruction fetch (IF) operation on the I4 instruction.

When the IPU finishes its instruction fetch (IF) operation on the I4 instruction, the ALPu starts a memory store (STM) operation on the I3, and shortly thereafter the IPU starts its execution of the I0 instruction again (assuming that in instruction I2 the branch-on-zero condition was not true).

Next, assuming that the data in the instruction cache 80 and in the operand cache 90 remains valid, the operation of the IPU and ALPU in executing the I0 through I4 instruction sequence speeds up. It will be noted that the time required by the IPU and the ALPU in executing their respective portions of the instructions is decreased, since memory accesses to fetch instructions or data are now being made to the instruction cache 80 or the operand cache 90, respectively, rather than to the main memory. Also contentions by the IPU and the ALPU for the system bus (150, FIG. 2B) are eliminated.

At this point, the IPU is fetching instructions in a manner such that there is always at least one instruction, and sometimes two instructions, pending for execution by the ALPU. Thus the operation of the ALPU is not held up by waiting for an instruction to be fetched by the IPU.

It will be apparent to those skilled in the art that the disclosed dual cache for independent prefetch and execution units may be modified in numerous ways and may assume many embodiments other than the preferred form specifically set out and described above.

For example, one could change the length of the instruction fetch pipeline. Also one could change the length and/or width of either or both of the cache memories. In addition, by using a slower clock one could use slower, less expensive memory devices.

Accordingly, it is intended by the appended claims to cover all modifications of the invention which fall within the true spirit and scope of the invention.

What is claimed is:

1. A digital computing system comprising:
   a main memory unit for storing at addressable locations thereof blocks of information, including instructions and operands, useable in said system; and
   a central processing unit for fetching and executing instructions comprising:
      an instruction prefetch unit for fetching said instructions;
      an arithmetic logic processing unit for executing said instructions;
      an instruction cache memory unit for storing blocks of said information, said instruction cache memory unit including first means coupled to said instruction prefetch unit for determining whether an instruction sought by said instruction prefetch unit is contained in said instruction cache memory unit, said first means also being coupled to said arithmetic logic processing unit for generating a first signal if information to be written by said arithmetic logic processing unit into said main memory unit is contained in said instruction cache memory unit; and
      an operand cache memory unit for storing blocks of said information, said operand cache memory unit including second means coupled to said arithmetic logic processing unit for determining whether an operand sought by said arithmetic logic processing unit is contained in said operand cache memory unit, said second means also being coupled to said arithmetic logic processing unit for generating a second signal if information to by written by said arithmetic logic processing unit into said main memory unit is contained in said operand cache memory unit;
      means enabling said arithmetic logic processing unit to write information simultaneously into said main memory unit and into said instruction cache memory unit in response to said first signal; and
      means enabling said arithmetic logic processing unit to write information simultaneously into said main memory and into said operand cache memory unit in response to said second signal.

* * * * *